(12) United States Patent
Murray et al.

(10) Patent No.: US 6,424,900 B2
(45) Date of Patent: Jul. 23, 2002

(54) MULTI-MODULE CONTROL-BY-WIRE ARCHITECTURE

(75) Inventors: Brian Thomas Murray, Novi; Joseph G. D'Ambrosio, Clarkston; Scott A. Millsap, Saginaw; Michael D. Byers, Ypsilanti, all of MI (US); Robert John Disser; Jeffrey Alan Heinrichs, both of Dayton, OH (US); Patrick Allen Mescher, Bellbrook, OH (US); Jeff Allan Foust, Eaton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/775,143

(22) Filed: Feb. 1, 2001

Related U.S. Application Data

(60) Provisional application No. 60/178,924, filed on Feb. 1, 2000.

(51) Int. Cl.[7] .............................. G06F 17/00; G06F 7/00
(52) U.S. Cl. .............................. 701/48; 701/22; 701/1; 701/29; 701/33; 701/34
(58) Field of Search ............................... 701/1, 22, 29, 701/30, 33, 34, 48

(56) References Cited

U.S. PATENT DOCUMENTS

| 4,542,679 A | 9/1985 | Murphy et al. ........... 91/363 A |
| 4,965,879 A | 10/1990 | Fischer et al. ................ 701/3 |
| 5,012,423 A | 4/1991 | Osder ......................... 701/116 |
| 6,095,620 A | * 8/2000 | Dillard et al. ................ 303/11 |

* cited by examiner

*Primary Examiner*—Gertrude Arthur
(74) *Attorney, Agent, or Firm*—Edmund P. Anderson

(57) ABSTRACT

A control-by-wire control system comprising a plurality of control device(s), each control device is responsive to, and configured to receive a control signal. Also included in the control-by-wire control system is a plurality of sensors wherein certain sensors are coupled to particular control devices. The sensors, each sense a parameter of the system and generate various sensor signals in response. A plurality of control modules is also included in control-by-wire control system. Each control module is interfaced to at least one of the control devices and is adapted to receive at least one or more sensor signals. The control modules also generate control signals for communication to the control devices. A communication interface of at least two communication networks provides communications among various control modules.

100 Claims, 3 Drawing Sheets

MULTI-MODULE CONTROL-BY-WIRE ARCHITECTURE

CROSS-REFERENCE TO RELATED APPLICATIONS

This application claims the benefit of U.S. provisional application No. 60/178,924, filed Feb. 1, 2000 the contents of which are incorporated by reference herein in their entirety.

BACKGROUND OF THE INVENTION

Steering and braking equipment assist a driver of a vehicle to direct and brake the vehicle in a controlled, predictable manner. In conventional steering assemblies, the operator controls the direction of the vehicle with the aid of a steering wheel. This wheel is mechanically connected, usually through a gear assembly to the roadwheels. In conventional braking systems, the operator controls the deceleration of the vehicle by applying a force to a pedal, displacing hydraulic fluid to transmit the force to a piston, which in turn applies force to a braking surface to slow the vehicle. To aid the operator, many steering and braking systems utilize an auxiliary system to generate additional force that is transmitted to a steering gear or braking assembly. The additional force reduces the effort required by the operator providing an "assist" or boost. Typically, this auxiliary force is generated by either a hydraulic drive or an electric motor.

In the case of steering systems, the steering wheel is mechanically connected directly to the roadwheels, the resulting mechanical assembly that provides the connection can be quite complicated and expensive to produce. Likewise, for braking systems, the configuration of hydraulic systems for braking may be complex, can leak, and are subject to contamination.

One advantage in having a direct connection is that the operator receives tactile feedback through the mechanical connections to the actuated component. For example, if the vehicle changes directions while it is moving, the operator will feel resistance in the steering wheel. However, such systems inherently include fabrication and implementation limitations and lack the capability to dynamically tailor system response characteristics to accommodate a variety of environmental conditions Steer-By-Wire, Brake-By-Wire, or Drive-By-Wire systems overcome some of these limitations by allowing for electronic control of braking and steering of a vehicle. Such systems can control the steering and braking functions of a vehicle using a control device, such as a steering wheel and brake pedal or joystick. Typically, these systems have more than one communication channel for communicating signals from the control device to the steering and braking motors such that, when that communication channel experiences an error, the entire system is not inoperable. However, these systems may not provide the best utilization of sensors, components, actuators, or controllers.

Control systems with redundant communications networks are typically accomplished using two different families of device controllers, wherein each family (e.g., braking and steering) of device controllers operates independently on two separate networks. These redundant systems require a significant amount of hardware, which is difficult and expensive to package in a vehicle with a control-by-wire system.

Control-by-wire generally refers to control of vehicular systems where the operator input and associated actuating device, such as for example a brake caliper or steering actuator, are connected by wire or wireless connection rather than a physical apparatus. Rather than such physical apparatus communicating a force, motion, or other actuating means directly to the actuating device, this connection, communicates a command signal to the actuating device, corresponding to the desired response of the actuating device. Integrated control-by-wire system and system architecture is also referred to as "X-by-Wire" to identify that more than one system or type of system is controlled "by wire".

Therefore, is it considered advantageous to identify an X-by-Wire control system and architecture that provides customizable system functional characteristics and optimizes controller and component utilization.

BRIEF SUMMARY OF THE INVENTION

A control-by-wire control system comprising a plurality of control device(s), each control device responsive to, and configured to receive a control signal. Also included in the control-by-wire control system is a plurality of sensors wherein certain sensors are coupled to particular control devices. The sensors, each sense a parameter of the system and generate various sensor signals in response. A plurality of control modules is also included in control-by-wire control system. Each control module is interfaced to at least one of the control devices and is adapted to receive at least one or more sensor signals. The control modules also generate control signals for communication to the control devices. A communication interface of at least two communication networks provides communications among various control modules. The control-by-wire control system is architected to ensure that inoperability of any one of the control devices, control modules, sensor signals, or communication networks, will not result in loss of functional capability of the control-by-wire system.

BRIEF DESCRIPTION OF THE DRAWINGS

Referring now to the accompanying drawings, which are meant to be exemplary, not limiting, and wherein like elements are numbered alike in the several figures.

DETAILED DESCRIPTION OF A PREFERRED EMBODIMENT

The disclosed X-by-Wire system architecture integrates brake-by-wire and steer-by-wire subsystems to afford synergistic control opportunities for braking, steering, and other aspects of vehicle dynamic control not available with such subsystems separately, in addition to the traditional steering and braking functions. For example, the architecture may be adapted to address and control additional vehicle characteristics and dynamics such as vehicle dynamic stability, or vehicle roll control via active suspension components. It will be appreciated that various functions in addition to steering and braking may also be mapped to the architecture. Functional requirements for system performance and capabilities dictate the manner in which functions are mapped and the configuration of system elements. For example, the braking and steering control functions are allocated to various component elements to ensure that loss of a single component or system capability does not result in the loss of a particular system functionality. However, the system architecture may be expanded to address additional levels of system operability. Moreover, replicated versions of allocated functions may be further allocated to control elements to address a multiplicity of component degradation(s). The degree of expansion of the architecture may be dictated by the level of fault tolerance prescribed by the particular vehicular system requirements. Finally, an architecture is disclosed which provides for adaptation and reallocation of functional capabilities from non-operative to operative system elements and components to ensure increased levels of operability and reliability.

The disclosed embodiments may be utilized in various types of vehicles employing electronic vehicle control. For example, vehicles and systems employing: electronic steering, steer-by-wire, electronic braking, brake-by-wire, drive-by-wire, or control-by-wire implementations. An exemplary embodiment, by way of illustration is described herein as it may be applied to an automobile employing a X-by-Wire system. While an exemplary embodiment is shown and described by illustration and reference to an integrated automobile steering and braking system, it will be appreciated by those skilled in the art that the invention is not limited to automobiles alone and may be applied to a variety of vehicles employing electronic steering or braking systems, or steer-by-wire, or- brake-by-wire systems. In the control-by-wire systems, the signal inputs are typically generated by an operator-interfaced source, e.g., steering wheel, brake pedal and/or a joystick as well as sensors detecting and measuring vehicle and component parameters. The control modules receive the signal inputs, generate control signals and communicate these control signals to the control devices associated with the particular control module and function.

Figure 1:
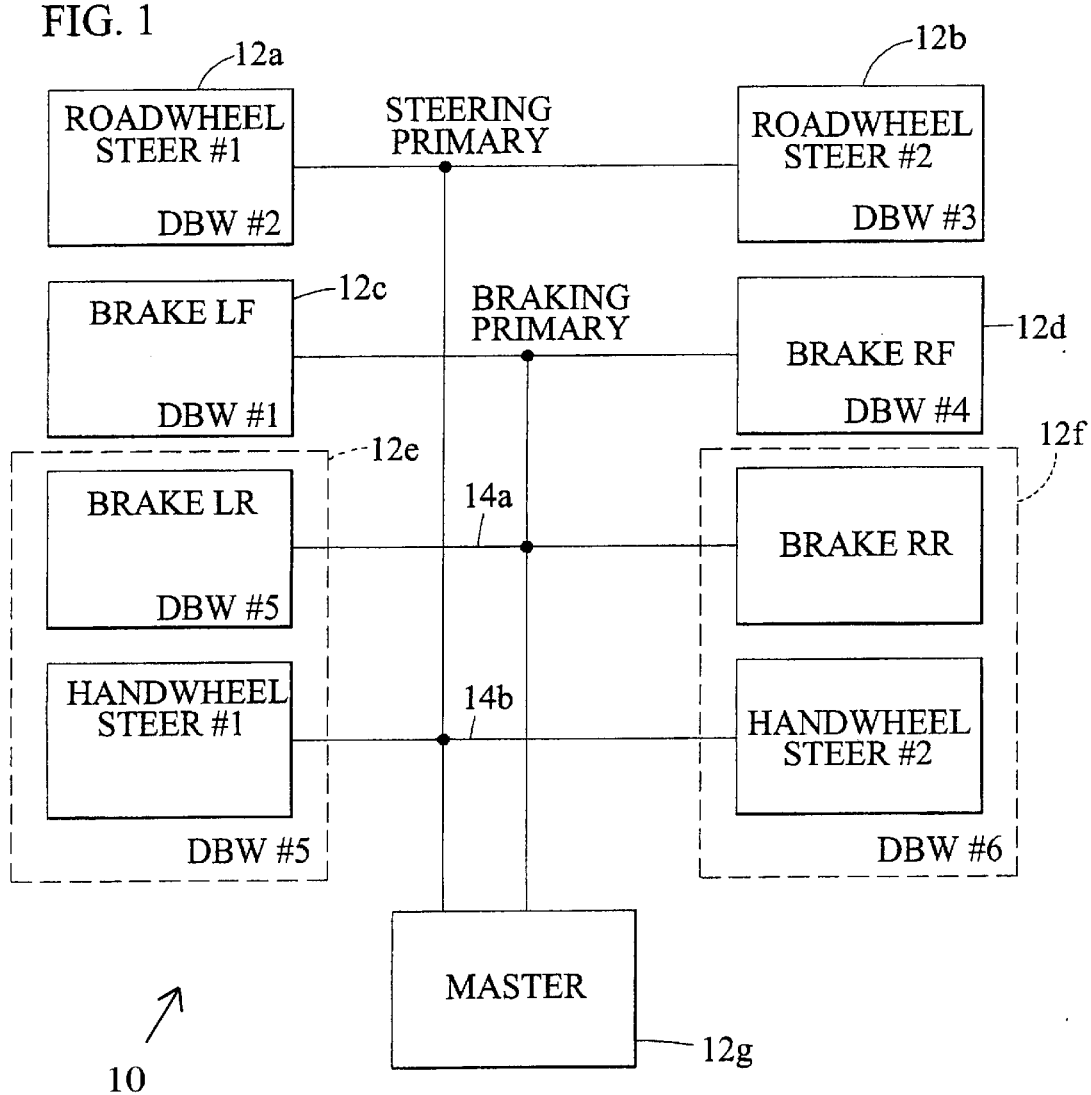
FIG. 1 is a block diagram depicting a six-control module interconnection architecture.

Referring to FIG. 1, an exemplary embodiment of a six-module controller interconnection architecture of an X-by-Wire system 10 is disclosed including dual-redundant communication bus interfaces. Such communication interfaces hereafter denoted networks, may include, but not be limited to, communications networks, bus systems or configurations, asynchronous and synchronous communications systems and protocols, and the like, as well as combinations thereof. In addition, communications networks and signal interfaces may take any form capable of transferring a signal or data, including electrical, optical, or radio and may include and employ various technologies in implementation, such as wired, wireless, fiber optic, and the like, including combinations thereof.

For example, the communications networks may be a redundant communications system and protocol such as defined by Time Triggered Protocol (TTP™) or MIL-STD-1553 and the like. In an embodiment, communication networks employing TTP™ are utilized. TTP™ is a time deterministic protocol, redundantly configured with two channels providing redundant communication capabilities for various control and data signals between control modules 12a–12g. The second communication channel, provides additional signal capacity for communications between control modules 12a–12g specifically to facilitate continued operation should the first become inoperative available. The communication interface allows coordinated action among control modules performing control functions as well as the exchange of sensor signals among the control modules.

Figure 2:
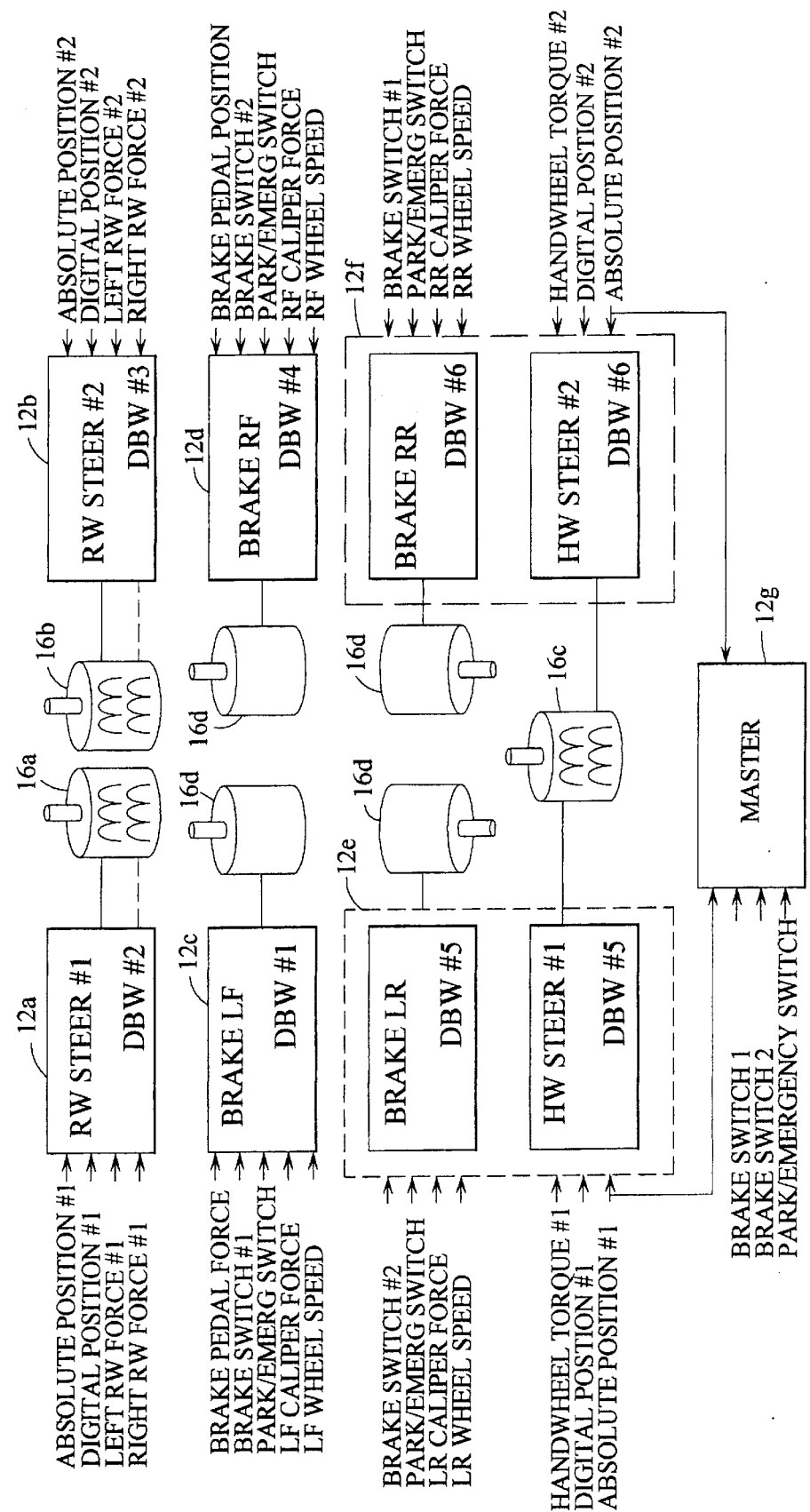
FIG. 2 is a block diagram of the architecture of FIG. 1 depicting steering and braking function interconnectivity.

FIG. 2 is a block diagram of the system architecture of FIG. 1 depicting integrated steering and braking function interconnectivity in an exemplary embodiment of a multi-function control or X-by-Wire (XBW) system 10. Throughout this document control-by-wire, X-by-wire, and Drive-by-wire will be utilized and treated synonymously as X-by-wire or XBW for short. In the Figures, a plurality of control module(s) 12a–12g are depicted in a configuration distributing the functional control requirements of the X-by-Wire system 10. The control modules 12a–12g are each adapted to include the necessary sensor interfaces to receive a variety of sensor signals as well as generate control signals to command a corresponding control device(s) 16a–16d. Additionally, each control module is configured to include self-diagnostic capabilities. Thereby, ensuring that every control module 12a–12g may internally evaluate its capabilities to perform the processes prescribed by its functional allocations. In order to perform the prescribed functions and allocated processing, as well as the computations therefore (e.g., the execution of control algorithm(s), and the like), the control modules 12a–12g may include, but not be limited to, a processor(s), computer(s), memory, storage, register(s), timing, interrupt(s), communication interfaces, and input/output signal interfaces, as well as combinations comprising at least one of the foregoing. For example, control modules 12a–12g may include input signal filtering to enable accurate sampling and conversion or acquisitions of such signals from communications interfaces. Additional features of the control modules 12a–12g and certain allocated processes therein are thoroughly discussed at a later point herein.

In an embodiment, six control modules 12a–12f are employed in a vehicle with functions allocated to the various system elements as follows. Road wheel steering is allocated to control modules 12a and 12b. Similarly, front braking is allocated to control modules 12c and 12d. Finally, rear braking and hand wheel steering functions are allocated to control modules 12e and 12f. A first communication network 14a and a second communication network 14b are utilized to facilitate the communications between each of the control modules 12a–12f. The first and second communication networks 14a and 14b are configured to maximize the communication bandwidth by appropriate partitioning of the functional requirements allocated to both the first and second communication networks 14a and 14b as well as the control modules 12a–12f. For example, steering may be primarily allocated to the first communication network 14a while braking primarily allocated to the second communication network 14b. Architecture isolation of the control modules 12c and 12d performing front braking from the control modules 12a and 12b allocated to road wheel steering provides enhanced tolerance of XBW system 10 functionality to loss of control capability. For example, loss of control modules 12a and 12b could be compensated for by the adaptation of control modules 12c and 12d to perform both braking functions as well as steering in the event of the loss of all steering system functionality.

Returning to the first and second communication networks 14a and 14b, cross control module communication is facilitated between control modules performing similar functions. For example, cross control module communication is provided between control module(s) 12a and 12b performing steering, between the control modules 12c and 12d performing braking, and finally between control modules 12e and 12f performing rear braking and hand wheel steer functions.

FIGS. 1 and 2 further illustrate an embodiment including the interconnection of another control module functioning as a supervisory controller (commonly denoted a master) 12g. The supervisory controller 12g is configured to provide the primary gateway for facilitating communication and data transfer between the first and second communication networks 14a and 14b. Thereby, providing for example, communication and yet isolation between the first and second communication networks 14a and 14b or more specifically between control modules allocated to one functionality such as braking and those control modules allocated to steering functions. Similarly, control modules 12e and 12f are also configured to provide a second and third capability for data transfer between the first and second communication networks 14a and 14b. It may be noted that the functional allocation to a supervisory controller 12g need not be allocated to a particular control module 12. Such allocation may be distributed among the control modules of the XBW system 10.

The supervisory controller 12g is also configured to provide for coordination of various allocated functions among the control modules to facilitate additional vehicle capabilities and functions. For example, the supervisory controller 12g may provide coordination between the steering and braking functions to facilitate enhanced vehicle dynamics.

Continuing with FIGS. 1 and 2, the sensor interfaces to the control modules 12a–12g are illustrated. The control modules perform the sensor conditioning and transfer of data to the first and second communication networks 14a and 14b. In some instances the direct connection of the sensor interfaces to controllers may also be desirable. For example, the steering wheel absolute positions are interfaced to the supervisory controller 12g. This direct interface permits continued driver input functionality even in the event of two successive losses or degradations of hand wheel steering functionality. In the disclosed embodiment, the architecture allocates steering command information to only two modules, therefore, to ensure a third means of acquiring and distributing steering command information, the absolute position sensors are independently interfaced to the supervisory controller 12g. Similarly, a first and second brake switches along with a parking brake switch are also interfaced directly to the supervisory controller 12g to ensure additional means of acquiring these signals to support certain braking functions.

A plurality of sensors (not shown) are distributed throughout the XBW system 10 and disposed within the vehicle as necessary to measure various vehicle or system parameters. A parameter of the X-by-Wire system 10 includes, but is not limited to characteristics, measurements, status, dynamic conditions, and states of any element of the X-by-Wire system 10 or vehicle. For example, positions, forces, velocities, accelerations, operating states and the like.

The allocation of functions to sensors and selection of sensors once again is dictated by system functional requirements. For example, the sensors are selected based upon the parameters that must be detected and measured to ensure proper control system command, operation, and functionality. Moreover, the sensors detect operator commanded control inputs for control system response. Sensors may be redundant in cases where the architecture dictates that additional information is necessary or there is a requirement for increased reliability for the measured information. For example, multiple sensors are allocated to the road wheel steering functionality as part of the feedback control for vehicle steering. The sensors are coupled to each of the respective control modules 12a–12g as functionally allocated and distributed. The sensors are further coupled to corresponding control devices 16a–16d as functionally allocated by the architecture for sensing vehicle parameters and parameters associated with each control device 16a–16d and responsively generating sensor signals.

Continuing once again with FIGS. 1 and 2, the sensor interfaces as allocated to the numerous control modules 12a–12g are also depicted. More specifically, the sensor signals as distributed within the architecture are shown. In an embodiment, the sensor interfaces functionally allocated to the road wheel steering, or more particularly to the control modules allocated to road wheel steer functions 12a and 12b include, but are not limited to: absolute position signals; digital position signal, left road wheel forces, and right road wheel forces. Each sensor includes multiple independent interfaces to each of the control modules 12a and 12b. Similarly, the sensor interfaces for the control modules 12c and 12d allocated to front braking include, but are not limited to: brake pedal forces, brake pedal positions, brake switch state (alternatively or in combination with a park brake switch acting as an emergency brake apply signal) respective brake caliper forces and respective wheel speeds.

Finally, the sensor interfaces for the control modules 12e and 12f allocated to hand wheel steering and rear braking include, but are not limited to: absolute position signals; digital position signals; hand wheel torque signals, brake pedal forces, brake pedal positions, brake switch state; park brake switch; respective brake caliper forces and respective wheel speeds. In addition to the driver command signals, each control module 12c, 12d, 12e, and 12f allocated to braking functions conditions the corresponding wheel speed sensor signal as well as transferring it to the system communications bus.

Also depicted in FIGS. 1 and 2 is the architecture of interconnection from the respective control modules 12a–12g to a variety of control devices 16. The control devices 16 may include, but not be limited to single or dual winding electric motors configured as desired to apply a controlling input to direct or control the vehicle (e.g., torque, force, or displacement). The control devices 16 are also allocated to address the system functionality and are distributed accordingly. Each control device 16 is adapted to receive control signals from its corresponding control module 12a–12f.

In an embodiment, control device(s) 16 allocated to the road wheel steering and hand wheel steering functions comprise dual winding electric motors 16a, 16b, and 16c respectively; each of which share a common housing and rotor. The control device(s) 16 allocated to braking comprise single winding electric motors 16d. For example, the road wheel steering function includes two dual winding electric motors 16a and 16b connected to a gear assist mechanism to steer the directable wheels of a vehicle (e.g., the front wheels of an automobile). Each control module 12a and 12b allocated to road wheel steering would be responsible to control two motor circuits in this circumstance. Likewise, the braking functions include four electric motors 16d connected to a reduction mechanism and to each wheel of a vehicle to facilitate braking. Each control module allocated to braking 12c, 12d, as well as 12e and 12f is configured to control a respective control device 16d.

Included within each control device 16c are appropriate feedback sensors allocated to detect positions and forces. As described above, each of the sensors interfaced to the respective control modules 12e, 12f, and 12g. Unique to the hand wheel steering functionality are additional position feedback sensors. Employing redundant feedback satisfies an architecture constraint that the XBW system 10, include the capability to tolerate the presence of a first component error within the hand wheel feedback force function. This constraint ensures that the operator continues to be provided tactile feedback following such an error. Such tactile feedback aids the operator in maintaining vehicle stability and control. Especially under dynamic steering conditions where the operator may exhibit a tendency to make excessive command inputs.

The control device 16c may further include passive elements (e.g., springs, dampers friction plates and the like) to provide feedback force and are not currently shown in the system architecture. Included within each control device 16d are appropriate feedback sensors allocated to detect positions and forces. As described above, each of the sensors is interfaced to the respective control modules 12a–12g. In addition, the control device(s) 16d include a caliper force measurement sensor to provide force feed back to the respective control modules 12c, 12d, 12e, and 12f facilitating braking functionality. Moreover, the control modules may also monitor the current delivered on each controllable device 16 to estimate the force being applied for additional feed back information.

Figure 3:
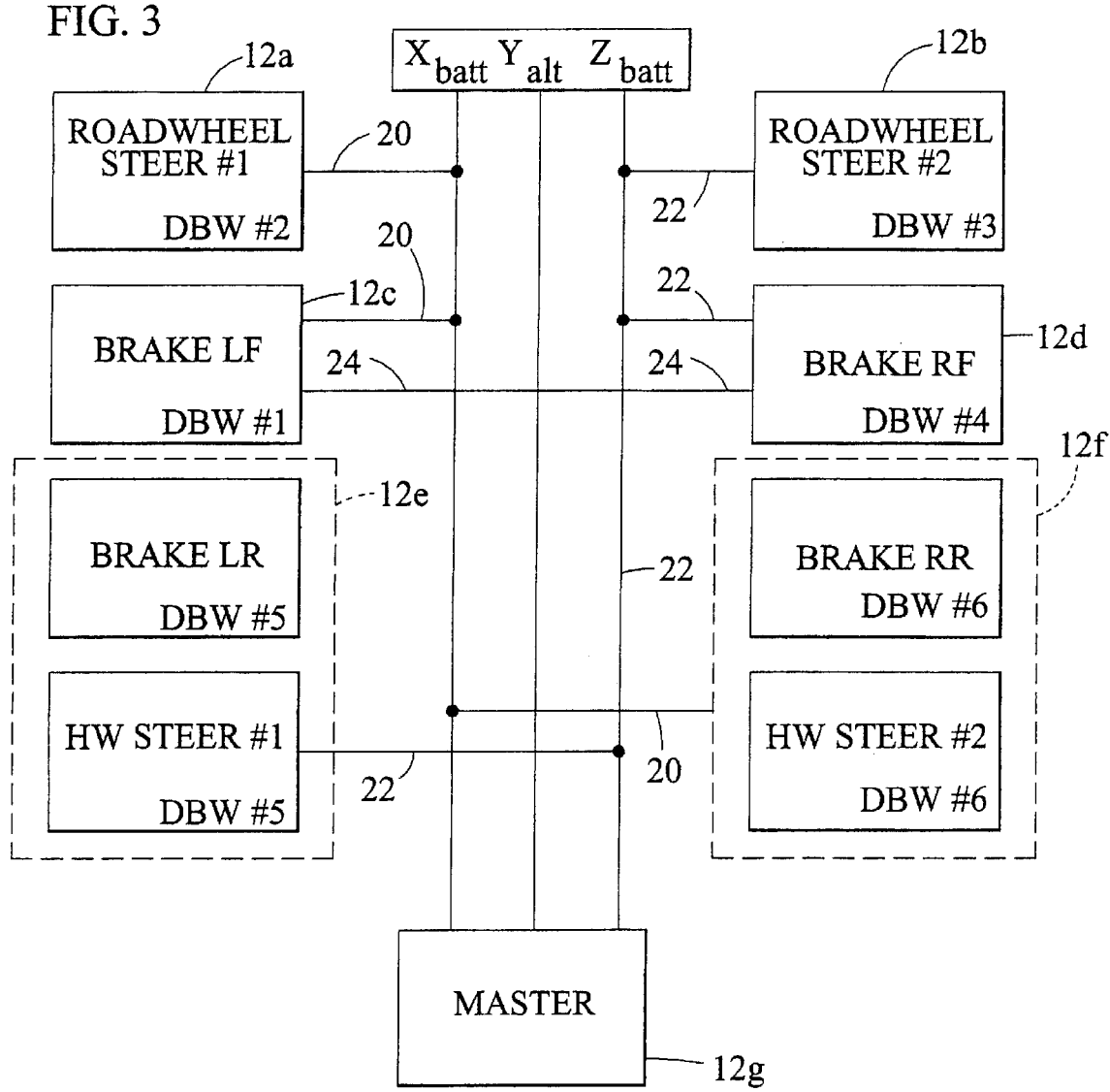
FIG. 3 is a block diagram depicting a power distribution topology based upon the architecture identified in FIG. 1.

Moving now to FIG. 3 a power distribution architecture for the control-by-wire system 10 is depicted. In an embodiment, three independent sources of power for the X-by-wire system 10 are depicted. Two battery supplies Battery X 20 and Battery Z 22, supply the control modules 12a and 12b allocated to the steer functions, whereas the Alternator Y 24 supplies the control modules 12c, and 12d allocated to front braking. It is noteworthy to appreciate that a three level hierarchy of capability is provided for both steering and braking functions (given that Battery X 20 and Battery Z 22 supplies are inoperative) by control modules 12c and 12d utilizing the Alternator Y 24 power supply to perform a steer by braking functionality. Therefore, triple redundancy of the steering functions may be accomplished through the utilization of three independent power supplies as depicted.

Each control module directs and sources the necessary power for each of the corresponding control device(s). Each of the control modules 12 also functions as power loads only. Any regenerated energy will be dissipated within the corresponding control module(s) 12 and control device(s) 16. Therefore each control module 12 will also include a means of depleting this energy as well as a means of ensuring that this energy is not directed back to the independent power sources 20, 22, 24. For example, this may be accomplished by a diode, rectification and load, or active device protection.

In an embodiment, two control modules 12a and 12b are adapted to deliver control signals to control device(s) 16a and 16b, which may be more particularly, two dual wound motors disposed at each steerable front wheel of a vehicle. Each control module (for example 12a) communicates with the other control module(s) (in this case 12b specifically) via the communication network 14a. Each control module 12a and 12b operates independently, such that if one control module (e.g., 12a) with associated control device(s) 16a is no longer operative, the second control module (e.g., 12b) can provide some limited level of control. If a control module 12a or 12b detects an error, that control module 12a or 12b discontinues commanding the respective control device 16a or 16b, while still providing communications to the other control modules 12c–12g.

In another embodiment, the X-by-wire system 10 further includes two control modules 12e and 12f, adapted to deliver control signals to control device(s) 16c, which may be more particularly, a dual wound motor disposed at the hand wheel of a vehicle for receiving operator input and providing tactile feedback to the operator. In addition, control modules 12e and 12f are each coupled to control device(s) 16d disposed at each rear wheel. Once again, which may be more specifically, to two brake motors. Each control module (for example 12e) communicates with the other control module(s) (in this case 12f) via the communication network 14b. Each control module 12e and 12f operates independently, such that if one control module for example 12e with associated control device(s) 16c and 16d is no longer operative, the second control module, for example 12f can provide some limited level of control. If a control module 12e or 12f detects an error, the control module 12 discontinues commanding the corresponding control device 16c or 16d, while still providing communications to the other control modules 12a, 12b, 12c, 12d, and 12g.

In yet another embodiment, the X-by-Wire system 10 further includes two additional control device(s) 16d, for example, brake motors, which may be disposed one at each front wheel of a vehicle, and to which control signals are communicated by two additional associated control modules in this instance, 12c and 12d. Once again, control module 12c communicates control signals to control device 16d disposed in this instance at the left wheel, for braking and communicates with all other control modules 12a–12g. Similarly, control module 12d communicates control signals to control device 16d, disposed in this instance at the right wheel, for braking and communicates with all other control modules 12a–12g. If a control module 12c or 12d detects an error, it discontinues controlling the respective control device 16d.

The disclosed method may be embodied in the form of computer-implemented processes and apparatuses for practicing those processes. The method can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus capable of executing the method. The present method can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus capable of executing the method. When implemented on a general-purpose microprocessor, the computer program code segments configure the microprocessor to create specific logic circuits.

Therefore, the foregoing disclosure provides methodologies and systems for allocating the functionality of a control-by-system to a plurality of elements, while ensuring that the loss of operational capability of any one element does not result in a loss of a prescribed functionality. In addition it will be appreciated that the disclosed embodiments provides for mapping and/or re-mapping of functions to other control modules as may be prescribed by system requirements.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A control-by-wire control system for implementing a plurality of control functions comprising:
a plurality of control device(s), disposed in a vehicle, wherein each control device of said plurality of control devices is responsive to and configured to receive a control signal;
a plurality of sensors, wherein at least two sensors of said plurality of sensors are coupled to at least two control devices of said plurality of control devices for sensing a parameter of said system and generating a plurality of sensor signals responsive thereto;
a plurality of control modules, wherein each control module of said plurality of control modules is interfaced to at least one of said plurality of control devices and is adapted to receive at least one sensor signal of said plurality of sensor signals, and generates said control signal for communication to said at least one control device of said plurality of control devices;
a communication interface having a first communication network and a second communication network for communicating among said plurality of control module(s);
a plurality of independent power sources interfaced to said plurality of control modules;
wherein said plurality of control functions is distributed among and allocated to said plurality of control modules; and
wherein loss of operational capability of any one of said plurality of control devices, any one of said plurality of control modules, any one of said plurality of sensor signals, any one of said plurality of independent power sources, said first communication network, said second communication network does not result in loss of functional capability of said control-by-wire control system.

2. The system of claim 1, wherein at least one control device of said plurality of control devices is adapted to control road wheel steering of said vehicle.

3. The system of claim 2, wherein said at least one control device comprises a dual winding electric motor configured to control a steerable wheel of said vehicle.

4. The system of claim 1, wherein at least one of said control devices is adapted to control braking of said vehicle.

5. The system of claim 4, wherein said at least one control devices comprises an electric motor disposed at a wheel of said vehicle.

6. The system of claim 1, wherein at least one of said control devices is adapted to control hand wheel steering of said vehicle.

7. The system of claim 6, wherein said at least one control device comprises a dual winding electric motor.

8. The system of claim 1, wherein each control module of said plurality of control modules comprises a self-diagnostic controller configured to test and evaluate processes performed therein and communicates data and status via said communication interface.

9. The system of claim 8, wherein at least two of said control modules are adapted to control road wheel steering of said vehicle.

10. The system of claim 8, wherein at least two of said control modules are adapted to control braking of said vehicle.

11. The system of claim 8, wherein at least two of said control modules are adapted to control hand wheel steering of said vehicle.

12. The system of claim 1, wherein said communication interface comprises at least two communication networks, wherein each network comprises at least two channels.

13. The system of claim 1, wherein said first communication network is coupled to at least two control modules of said plurality of control modules allocated to road wheel steering functionality.

14. The system of claim 1, wherein said first communication network is coupled to at least two control modules of said plurality of control modules allocated to hand wheel steering functionality.

15. The system of claim 1, wherein said first communication network is coupled to a control module of said plurality of control modules allocated to supervisory functionality.

16. The system of claim 1, wherein said second communication network is coupled to at least two control modules of said plurality of control modules allocated to front wheel braking functionality.

17. The system of claim 1, wherein said second communication network is coupled to at least two control modules of said plurality of control modules allocated to rear wheel braking functionality.

18. The system of claim 1, wherein said second communication network is coupled to a control module of said plurality of control modules allocated to supervisory functionality.

19. The system of claim 1, wherein said first communication network and said second communication network are coupled to a control module of said plurality of control modules allocated to supervisory functionality.

20. The system of claim 1, wherein said first communication network and said second communication network are coupled to at least two control modules of said plurality of control modules allocated to hand wheel steering and rear braking functionality.

21. The system of claim 1, wherein a parameter of said system comprises characteristics, dynamics conditions, and states of any element of said system.

22. The system of claim 1, wherein each control module of said plurality of control modules is interfaced to at least one independent power source of said plurality of independent power sources.

23. The system of claim 22, wherein each control module of said plurality of control modules allocated to braking is interfaced to at least two independent power sources of said plurality of independent power sources.

24. The system of claim 22, wherein each control module of said plurality of control modules allocated to supervisory functions is interfaced to each independent power sources of said plurality of independent power sources.

25. The system of claim 1, wherein said plurality of control functions includes redundant functional capabilities such that a control function of said plurality of control functions are replicated and distributed among and allocated to said plurality of control modules.

26. The system of claim 25, wherein each control module of said plurality of control modules allocated to a particular control function.

27. The system of claim 25, wherein said plurality of control functions is allocated to six control modules.

28. The system of claim 27 wherein said plurality of control functions includes braking, road wheel steering, hand wheel steer functions, and coordinated steering and braking functions.

29. The system of claim 25, wherein at least one of said control devices is adapted to control braking of said vehicle.

30. The system of claim 29, wherein said at least one control devices comprises an electric motor disposed at a wheel of said vehicle.

31. The system of claim 29, wherein at least one of said control devices is adapted to control hand wheel steering of said vehicle.

32. The system of claim 31, wherein said at least one control device comprises a dual winding electric motor.

33. The system of claim 31, wherein each control module of said plurality of control modules comprises a self-diagnostic controller configured to test and evaluate processes performed therein and communicates data and status via said communication interface.

34. The system of claim 33, wherein at least two of said control modules are adapted to control road wheel steering of said vehicle.

35. The system of claim 33, wherein at least two of said control modules are adapted to control braking of said vehicle.

36. The system of claim 33, wherein at least two of said control modules are adapted to control hand wheel steering of said vehicle.

37. The system of claim 33, wherein said communication interface comprises at least two communication networks, wherein each network comprises at least two channels.

38. The system of claim 37, wherein said first communication network is coupled to at least two control modules of said plurality of control modules allocated to road wheel steering functionality.

39. The system of claim 38, wherein said first communication network is coupled to at least two control modules of said plurality of control modules allocated to hand wheel steering functionality.

40. The system of claim 39, wherein said first communication network is coupled to a control module of said plurality of control modules allocated to supervisory functionality.

41. The system of claim 40, wherein said second communication network is coupled to at least two control modules of said plurality of control modules allocated to front wheel braking functionality.

42. The system of claim 41, wherein said second communication network is coupled to at least two control modules of said plurality of control modules allocated to rear wheel braking functionality.

43. The system of claim 42, wherein said second communication network is coupled to a control module of said plurality of control modules allocated to supervisory functionality.

44. The system of claim 43, wherein said first communication network and said second communication network are coupled to a control module of said plurality of control modules allocated to supervisory functionality.

45. The system of claim 44, wherein said first communication network and said second communication network are coupled to at least two control modules of said plurality of control modules allocated to hand wheel steering and rear braking functionality.

46. The system of claim 45, wherein a parameter of said system comprises characteristics, dynamics conditions, and states of any element of said system.

47. The system of claim 46, wherein each control module of said plurality of control modules is interfaced to at least one independent power source of said plurality of independent power sources.

48. The system of claim 47, wherein each control module of said plurality of control modules allocated to braking is interfaced to at least two independent power sources of said plurality of independent power sources.

49. The system of claim 48, wherein each control module of said plurality of control modules allocated to supervisory functions is interfaced to each independent power sources of said plurality of independent power sources.

50. The system of claim 49, wherein each control module of said plurality of control modules allocated to a particular control function of said vehicle is interfaced to an independent power source of said plurality of independent power sources.

51. A vehicle including a drive by wire control system comprising:
a plurality of control device(s), disposed in said vehicle, wherein each control device of said plurality of control devices is responsive to and configured to receive a control signal;
a plurality of sensors, wherein at least two sensors of said plurality of sensors are coupled to at least two control devices of said plurality of control devices for sensing a parameter of said system and generating a plurality of sensor signals responsive thereto;
a plurality of control modules, wherein each control module of said plurality of control modules is interfaced to at least one of said plurality of control devices and is adapted to receive at least one sensor signal of said plurality of sensor signals, and generates said control signal for communication to said at least one control device of said plurality of control devices;
a communication interface having a first communication network and a second communication network for communicating among said plurality of control module(s);
a plurality of independent power sources interfaced to said plurality of control modules;
wherein said plurality of control functions is distributed among and allocated to said plurality of control modules; and
wherein loss of operational capability of any one of said plurality of control devices, any one of said plurality of control modules, any one of said plurality of sensor signals, any one of said plurality of independent power sources, said first communication network, said second communication network does not result in loss of functional capability of said control-by-wire control system.

52. The vehicle of claim 51, wherein at least one control device of said plurality of control devices is adapted to control road wheel steering of said vehicle.

53. The vehicle of claim 52, wherein said at least one control device comprises a dual winding electric motor configured to control a steerable wheel of said vehicle.

54. The vehicle of claim 51, wherein at least one of said control devices is adapted to control braking of said vehicle.

55. The vehicle of claim 54, wherein said at least one control devices comprises an electric motor disposed at a wheel of said vehicle.

56. The vehicle of claim 51, wherein at least one of said control devices is adapted to control hand wheel steering of said vehicle.

57. The vehicle of claim 56, wherein said at least one control device comprises a dual winding electric motor.

58. The vehicle of claim 51, wherein each control module of said plurality of control modules comprises a self-diagnostic controller configured to test and evaluate processes performed therein and communicates data and status via said communication interface.

59. The vehicle of claim 58, wherein at least two of said control modules are adapted to control road wheel steering of said vehicle.

60. The vehicle of claim 58, wherein at least two of said control modules are adapted to control braking of said vehicle.

61. The vehicle of claim 58, wherein at least two of said control modules are adapted to control hand wheel steering of said vehicle.

62. The vehicle of claim 51, wherein said communication interface comprises at least two communication networks, wherein each network comprises at least two channels.

63. The vehicle of claim 51, wherein said first communication network is coupled to at least two control modules of said plurality of control modules allocated to road wheel steering functionality.

64. The vehicle of claim 51, wherein said first communication network is coupled to at least two control modules of said plurality of control modules allocated to hand wheel steering functionality.

65. The vehicle of claim 51, wherein said first communication network is coupled to a control module of said plurality of control modules allocated to supervisory functionality.

66. The vehicle of claim 51, wherein said second communication network is coupled to at least two control modules of said plurality of control modules allocated to front wheel braking functionality.

67. The vehicle of claim 51, wherein said second communication network is coupled to at least two control modules of said plurality of control modules allocated to rear wheel braking functionality.

68. The vehicle of claim 51, wherein said second communication network is coupled to a control module of said plurality of control modules allocated to supervisory functionality.

69. The vehicle of claim 51, wherein said first communication network and said second communication network are coupled to a control module of said plurality of control modules allocated to supervisory functionality.

70. The vehicle of claim 51, wherein said first communication network and said second communication network are coupled to at least two control modules of said plurality of control modules allocated to hand wheel steering and rear braking functionality.

71. The vehicle of claim 51, wherein a parameter of said system comprises characteristics, dynamics conditions, and states of any element of said system.

72. The vehicle of claim 51, wherein each control module of said plurality of control modules is interfaced to at least one independent power source of said plurality of independent power sources.

73. The vehicle of claim 72, wherein each control module of said plurality of control modules allocated to braking is interfaced to at least two independent power sources of said plurality of independent power sources.

74. The vehicle of claim 72, wherein each control module of said plurality of control modules allocated to supervisory functions is interfaced to each independent power sources of said plurality of independent power sources.

75. The vehicle of claim 51, wherein said plurality of control functions includes redundant functional capabilities such that a control function of said plurality of control functions are replicated and distributed among and allocated to said plurality of control modules.

76. The vehicle of claim 75, wherein each control module of said plurality of control modules allocated to a particular control function.

77. The vehicle of claim 75, wherein said plurality of control functions is allocated to six control modules.

78. The vehicle of claim 77 wherein said plurality of control functions includes braking, road wheel steering, hand wheel steer functions, and coordinated steering and braking functions.

79. The vehicle of claim 75, wherein at least one of said control devices is adapted to control braking of said vehicle.

80. The vehicle of claim 79, wherein said at least one control devices comprises an electric motor disposed at a wheel of said vehicle.

81. The vehicle of claim 79, wherein at least one of said control devices is adapted to control hand wheel steering of said vehicle.

82. The vehicle of claim 81, wherein said at least one control device comprises a dual winding electric motor.

83. The vehicle of claim 81, wherein each control module of said plurality of control modules comprises a self-diagnostic controller configured to test and evaluate processes performed therein and communicates data and status via said communication interface.

84. The vehicle of claim 83, wherein at least two of said control modules are adapted to control road wheel steering of said vehicle.

85. The vehicle of claim 83, wherein at least two of said control modules are adapted to control braking of said vehicle.

86. The vehicle of claim 83, wherein at least two of said control modules are adapted to control hand wheel steering of said vehicle.

87. The vehicle of claim 83, wherein said communication interface comprises at least two communication networks, wherein each network comprises at least two channels.

88. The vehicle of claim 87, wherein said first communication network is coupled to at least two control modules of said plurality of control modules allocated to road wheel steering functionality.

89. The vehicle of claim 88, wherein said first communication network is coupled to at least two control modules of said plurality of control modules allocated to hand wheel steering functionality.

90. The vehicle of claim 89, wherein said firs t communication network is coupled to a control module of said plurality of control modules allocated to supervisory functionality.

91. The vehicle of claim 90, wherein said second communication network is coupled to at least two control modules of said plurality of control modules allocated to front wheel braking functionality.

92. The vehicle of claim 91, wherein said second communication network is coupled to at least two control modules of said plurality of control modules allocated to rear wheel braking functionality.

93. The vehicle of claim 92, wherein said second communication network is coupled to a control module of said plurality of control modules allocated to supervisory functionality.

94. The vehicle of claim 93, wherein said first communication network and said second communication network are coupled to a control module of said plurality of control modules allocated to supervisory functionality.

95. The vehicle of claim 94, wherein said first communication network and said second communication network are coupled to at least two control modules of said plurality of control modules allocated to hand wheel steering and rear braking functionality.

96. The vehicle of claim 95, wherein a parameter of said system comprises characteristics, dynamics conditions, and states of any element of said system.

97. The vehicle of claim 96, wherein each control module of said plurality of control modules is interfaced to at least one independent power source of said plurality of independent power sources.

98. The vehicle of claim 97, wherein each control module of said plurality of control modules allocated to braking is interfaced to at least two independent power sources of said plurality of independent power sources.

99. The vehicle of claim 98, wherein each control module of said plurality of control modules allocated to supervisory functions is interfaced to each independent power sources of said plurality of independent power sources.

100. The vehicle of claim 99, wherein each control module of said plurality of control modules allocated to a particular control function of said vehicle is interfaced to an independent power source of said plurality of independent power sources.

* * * * *